US012745140B2

(12) United States Patent
Guan

(10) Patent No.: US 12,745,140 B2
(45) Date of Patent: Sep. 22, 2026

(54) METHOD FOR CALLING AND COMMUNICATION APPARATUS

(71) Applicant: Samsung Electronics Co., Ltd., Suwon-si (KR)

(72) Inventor: Chao Guan, Suzhou Industrial Park (CN)

(73) Assignee: Samsung Electronics Co., LTD, Gyeonggi-Do (KR)

( * ) Notice: Subject to any disclaimer, the term of this patent is extended or adjusted under 35 U.S.C. 154(b) by 288 days.

(21) Appl. No.: 18/495,917

(22) Filed: Oct. 27, 2023

(65) Prior Publication Data

US 2024/0323778 A1 Sep. 26, 2024

(30) Foreign Application Priority Data

Mar. 24, 2023 (CN) ......................... 202310301448.6

(51) Int. Cl.
*H04W 36/00* (2009.01)

(52) U.S. Cl.
CPC ............................... *H04W 36/0083* (2013.01)

(58) Field of Classification Search
CPC .................... H04W 36/0083; H04W 36/00226
USPC .......................................................... 455/436
See application file for complete search history.

(56) References Cited

U.S. PATENT DOCUMENTS 9,288,720 B2 3/2016 Nukala et al.
10,178,585 B2 1/2019 Huang-Fu et al.
10,863,392 B2 12/2020 Kim et al.
2020/0112887 A1* 4/2020 Kwok ................. H04W 36/302
2020/0383027 A1 12/2020 Venkataraman et al.
2021/0007030 A1 1/2021 Huang et al.
2021/0368398 A1 11/2021 Sillanpaa et al.
2021/0377819 A1 12/2021 Rahman
2022/0060953 A1* 2/2022 Lee ..................... H04W 36/362
2022/0345949 A1* 10/2022 Youn ................... H04L 65/1016
2023/0388886 A1* 11/2023 Huang .............. H04W 36/0088
2024/0015604 A1* 1/2024 Zhang ............. H04W 36/00224

FOREIGN PATENT DOCUMENTS

CN 115529642 A 12/2022
WO 2017177427 A1 10/2017
WO 2022062686 A1 3/2022
WO 2022121732 A1 6/2022

OTHER PUBLICATIONS

TS 23.502 of the 3GPP Protocol (Jul. 2021).
Chinese Office Action issued Jan. 9, 2026 in Chinese Patent Application No. 202310301448.6.
3GPP TSG-RAN WG2 Meeting #109bis electronic R2-2003408, “UL LBT failure recovery for target cell”.

* cited by examiner

*Primary Examiner* — Hirdepal Singh
(74) *Attorney, Agent, or Firm* — Harness, Dickey & Pierce, P.L.C.

(57) ABSTRACT

A method for calling performed by a user equipment (UE) including establishing a call based on a first network in which the UE camps, determining whether a first command for handover or redirection to a second network is received from the first network, and performing an autonomous redirection in response to determining that the first command is not received and a duration between the establishing and the determining exceeds a first threshold, the autonomous redirection redirecting the UE to the second network for continuation of the call.

20 Claims, 9 Drawing Sheets

FIG. 2

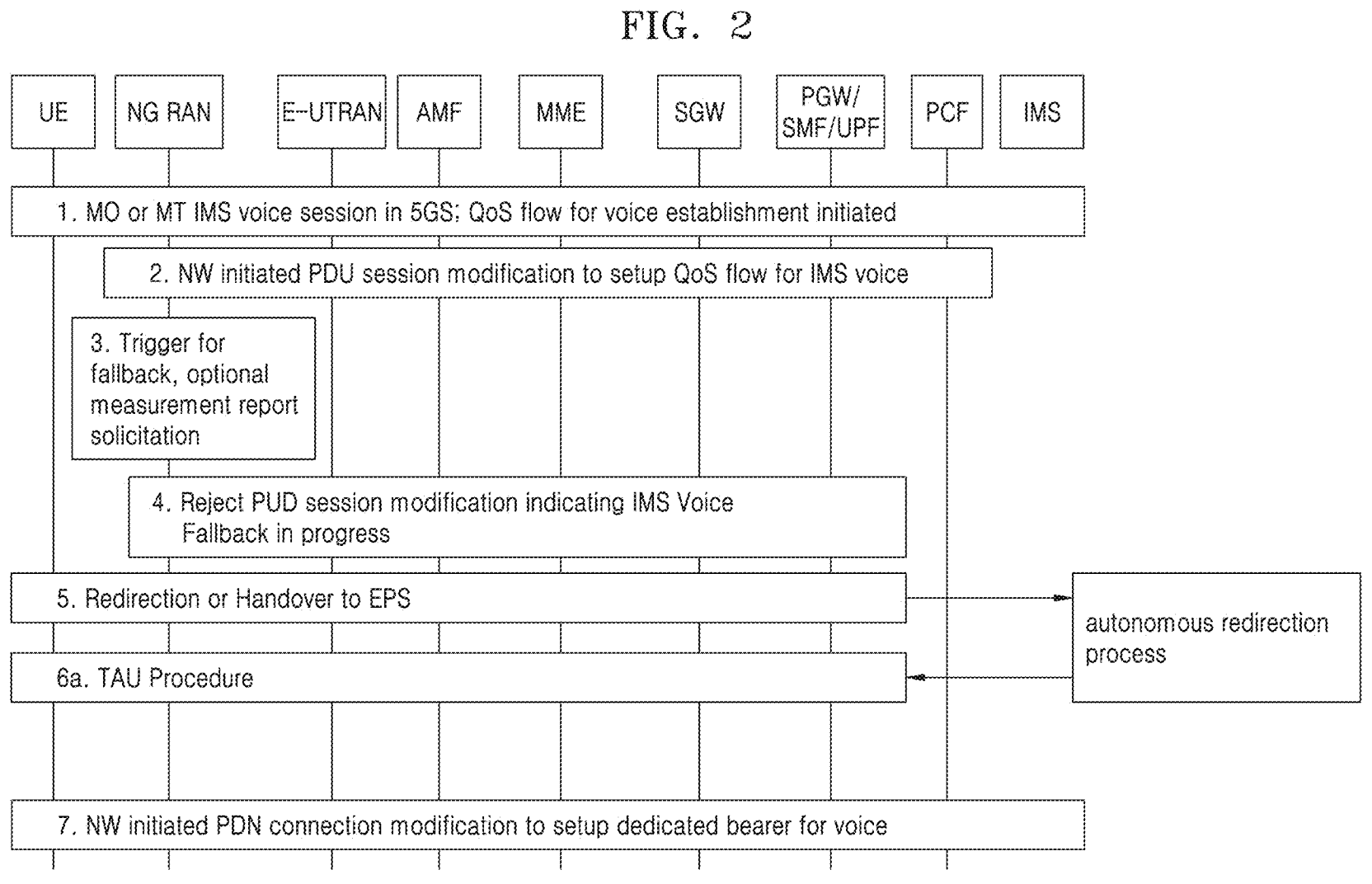

UE
NG RAN
E-UTRAN
AMF
MME
SGW
PGW/SMF/UPF
PCF
IMS

1. MO or MT IMS voice session in 5GS: QoS flow for voice establishment initiated 2. NW initiated PDU session modification to setup QoS flow for IMS voice 3. Trigger for fallback, optional measurement report solicitation 4. Reject PUD session modification indicating IMS Voice Fallback in progress 5. Redirection or Handover to EPS autonomous redirection process 6a. TAU Procedure 7. NW initiated PDN connection modification to setup dedicated bearer for voice

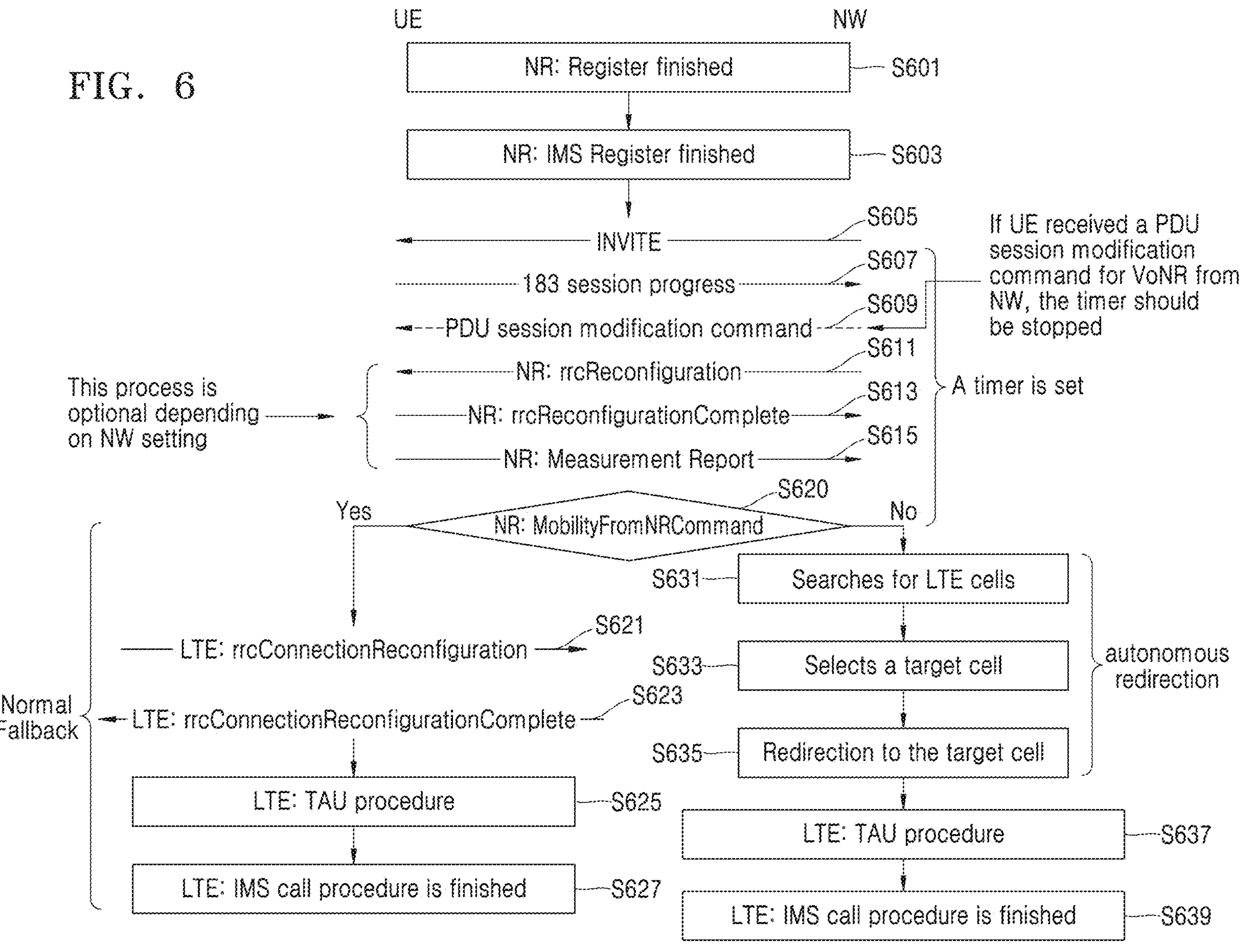
FIG. 6
UE
NW
NR: Register finished
S601
NR: IMS Register finished
S603
INVITE
S605
183 session progress
S607
PDU session modification command
S609
NR: rrcReconfiguration
S611
NR: rrcReconfigurationComplete
S613
NR: Measurement Report
S615
If UE received a PDU session modification command for VoNR from NW, the timer should be stopped
A timer is set
This process is optional depending on NW setting
NR: MobilityFromNRCommand
S620
Yes
No
LTE: rrcConnectionReconfiguration
S621
LTE: rrcConnectionReconfigurationComplete
S623
LTE: TAU procedure
S625
LTE: IMS call procedure is finished
S627
Normal Fallback
Searches for LTE cells
S631
Selects a target cell
S633
Redirection to the target cell
S635
autonomous redirection
LTE: TAU procedure
S637
LTE: IMS call procedure is finished
S639

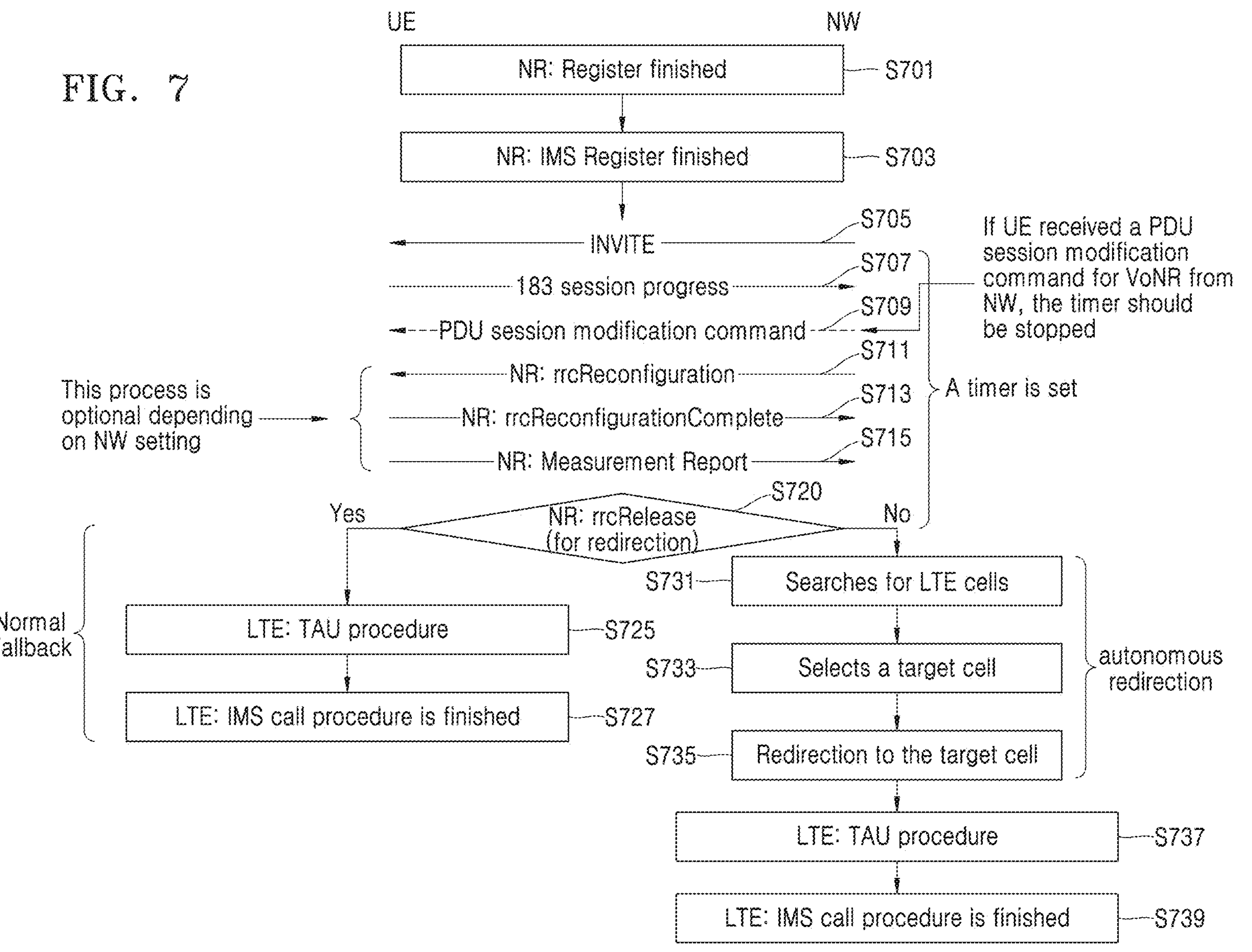
FIG. 7
UE
NW
NR: Register finished
S701
NR: IMS Register finished
S703
INVITE
S705
183 session progress
S707
PDU session modification command
S709
NR: rrcReconfiguration
S711
NR: rrcReconfigurationComplete
S713
NR: Measurement Report
S715
If UE received a PDU session modification command for VoNR from NW, the timer should be stopped
A timer is set
This process is optional depending on NW setting
S720
NR: rrcRelease (for redirection)
Yes
No
LTE: TAU procedure
S725
LTE: IMS call procedure is finished
S727
Normal Fallback
Searches for LTE cells
S731
Selects a target cell
S733
Redirection to the target cell
S735
autonomous redirection
LTE: TAU procedure
S737
LTE: IMS call procedure is finished
S739

METHOD FOR CALLING AND COMMUNICATION APPARATUS

This application claims the benefit of priority to Chinese Patent Application No. 202310301448.6 filed on Mar. 24, 2023 in the Chinese Intellectual Property Office, the disclosure of which is incorporated herein in its entirety by reference.

BACKGROUND

The present disclosure generally relates to wireless communication, more particularly, relates to a method for calling and a communication apparatus.

With the rapid development of mobile communication, the fifth generation 5G technology (New Radio, NR) is gradually replacing the fourth generation 4G technology (Long Term Evolution, LTE). At present, since the 5G infrastructure facility is still not complete, the voice service in 5G network comprises two modes: VoNR (Voice Over New Radio) in which the call is made directly in the 5G network if the 5G network has the voice service bearing capacity, and VOLTE (Voice Over Long-Term Evolution) in which an evolved packet system fallback (EPS FB) scheme is adopted to fallback the voice service to the 4G network from the 5G network, such that a terminal in the 5G network makes a call in the 4G network through VOLTE.

There are two methods to fallback to the 4G network from the 5G network in the EPS FB scheme: one is fallback to 4G by handover (HO), and the other is fallback to 4G by redirection. Which method is implemented depends on the planning and configuration of the network.

Fallback to the 4G network from the 5G network through the EPS FB scheme involves operations of different systems. If a handover or redirection failure occurs, the EPS FB call would fail.

SUMMARY

This Summary is provided to introduce a selection of concepts in a simplified form that are further described below in the Detailed Description. This Summary is not intended to identify key features and/or essential features of the claimed subject matter, nor is it intended to be used as an aid in determining the scope of the claimed subject matter.

According to some example embodiments, technology is provided to improve the success rate of EPS FB calls.

According to some example embodiments, a method for calling performed by a user equipment (UE) comprises: establishing a call based on a first network in which the UE camps, determining whether a first command for handover or redirection to a second network is received from the first network, and performing an autonomous redirection in response to determining that the first command is not received and a duration between the establishing and the determining exceeds a first threshold, the autonomous redirection redirecting the UE to the second network for continuation of the call.

The method may further comprise performing the handover or redirection to the second network in response to determining that the first command is received, and executing the call in the second network.

The method may further comprise determining whether a second command for executing the call in the first network is received from the first network, and executing the call in the first network in response to determining that the second command is received, the determining of whether the first command is received from the first network may be performed in response to determining that the second command is not received.

The method may further comprise starting a timer when an invite message is transmitted or received by the UE, the duration may be measured from the starting of the timer.

The first threshold may be within a range of 1 s to 2.5 s.

The first threshold may be 1.5 s.

The performing of the autonomous redirection may comprise selecting a target cell from among cells in the second network, and redirecting from the first network to the target cell.

The selecting of the target cell may comprise: obtaining signal quality parameters or frequency points of the cells in the second network, and selecting as the target cell one of a cell having a signal quality parameter greater than a second threshold, or a cell of which a frequency point is a first frequency point.

The selecting of the target cell may comprise: selecting the target cell based on information of a cell in which the UE has previously camped.

The selecting of the target cell may comprise: selecting the target cell based on a reconfiguration message received by the UE from the first network.

The first network may be a 5G network and the second network may be a 4G network.

According to some example embodiments, a communication apparatus comprises: processing circuitry configured to establish a call based on a first network in which the communication apparatus camps, determine whether a first command for handover or redirection to a second network is received from the first network, and perform an autonomous redirection in response to determining that the first command is not received and a duration exceeding a first threshold, the duration being between the establishment of the call and the determination that the first commend is not received, and the autonomous redirection redirecting the communication apparatus to the second network for continuation of the call.

The processing circuitry may be configured to perform the handover or redirection to the second network in response to determining that the first command is received, and execute the call in the second network.

The processing circuitry may further be configured to determine whether a second command for executing the call in the first network is received from the first network, and execute the call in the first network in response to determining that the second command is received, the determination of whether the first command is received from the first network may be performed in response to determining that the second command is not received.

The processing circuitry may be configured to start a timer when an invite message is transmitted or received by the communication apparatus, the duration may be measured from the start of the timer.

The first threshold may be within a range of 1 s to 2.5 s.

The first threshold may be 1.5 s.

The processing circuitry may be configured to perform the autonomous redirection by selecting a target cell from among cells in the second network, and redirecting from the first network to the target cell.

The processing circuitry may be configured to select the target cell by: obtaining signal quality parameters or frequency points of the cells in the second network, and selecting as the target cell one of a cell having a signal quality parameter greater than a second threshold, or a cell of which a frequency point is a first frequency point.

The processing circuitry may be configured to select the target cell by selecting the target cell based on information of a cell in which the UE has previously camped.

The processing circuitry may be configured to select the target cell by selecting the target cell based on a reconfiguration message received by the UE from the first network.

The first network may be a 5G network and the second network may be a 4G network.

According to some example embodiments, a non-transitory computer-readable storage medium stores instructions that, when executed by at least one processor of a user equipment (UE), cause the at least one processor to execute a method for calling, the method comprising: establishing a call based on a first network in which the UE camps, determining whether a first command for handover or redirection to a second network is received from the first network, and performing an autonomous redirection in response to determining that the first command is not received and a duration between the establishing and the determining exceeds a first threshold, the autonomous redirection redirecting the UE to the second network for continuation of the call.

The method may further comprise performing the handover or redirection to the second network in response to determining that the first command is received, and executing the call in the second network.

The method may further comprise determining whether a second command for executing the call in the first network is received from the first network, and executing the call in the first network in response to determining that the second command is received, the determining of whether the first command is received from the first network may be performed in response to determining that the second command is not received.

The first network may be a 5G network and the second network may be a 4G network The inventive concepts provide a method for calling performed by a UE, which may enable the UE to autonomously redirect to the LTE cell when it fails to receive a handover or redirection command from the network, thereby ensuring (or improving the likelihood of) the success of EPS FB call.

Other aspects and/or advantages of the inventive concepts will be partially described in the following description, and a part will be apparent through the description and/or may be learn through the practice of some example embodiments.

BRIEF DESCRIPTION OF THE DRAWINGS

The above and other objects, features and advantages of the present disclosure will become more apparent through the following detailed description together with the accompanying drawings in which:

FIG. 2 is a diagram illustrating a process of calling according to some example embodiments of the present disclosure;

FIG. 6 illustrates a process of a handover-based EPS FB call according to some example embodiments of the present disclosure;

FIG. 7 illustrates a process of a redirection-based EPS FB call according to some example embodiments of the present disclosure;

DETAILED DESCRIPTION

Figure 1:
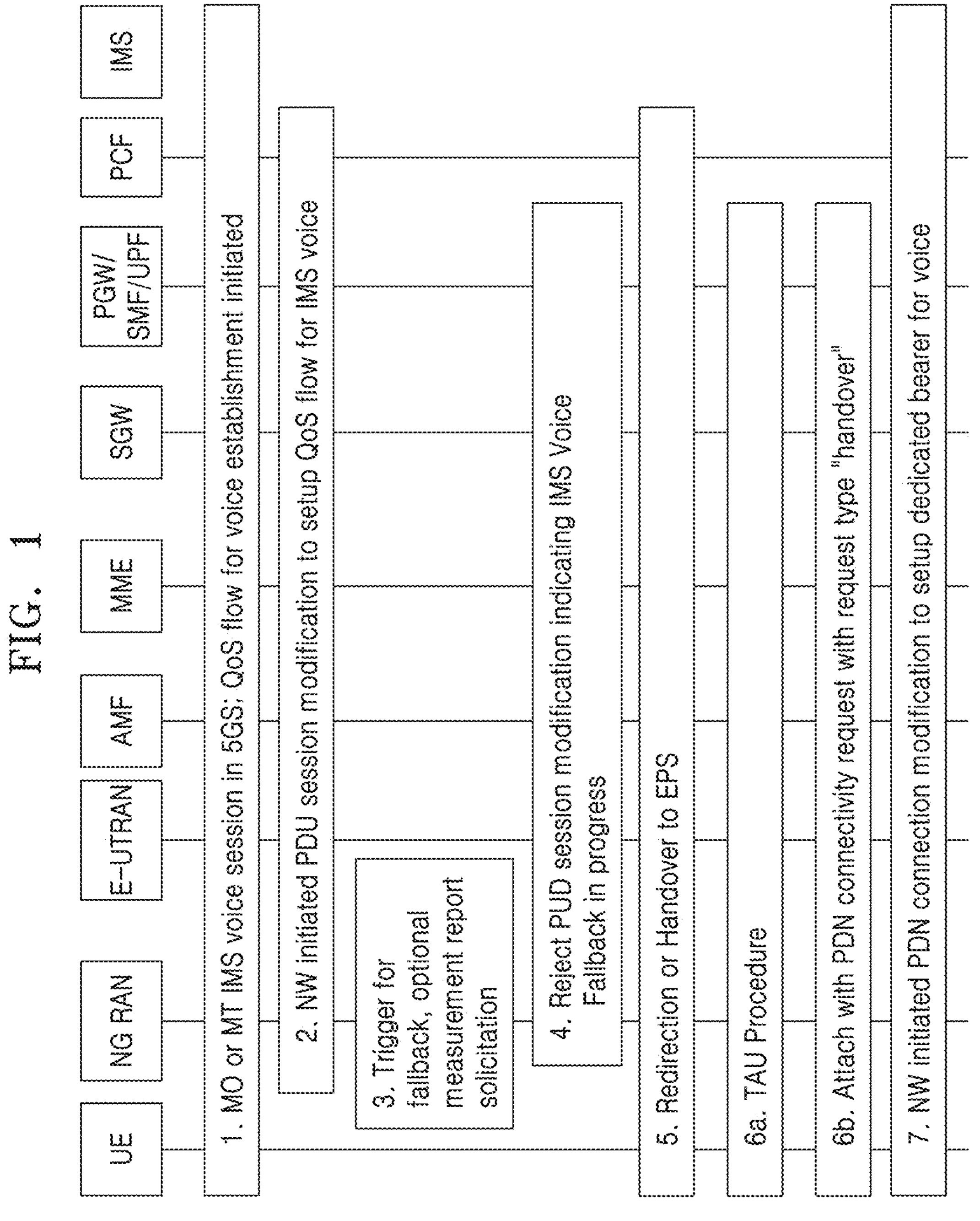
FIG. 1 is a diagram illustrating a process of an EPS FB call according to the 3GPP protocol.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of the present application. For example, the sequences of operations described herein are merely examples, and are not limited to those set forth herein, but may be changed as will be apparent after an understanding of disclosure of the present application, or may occur in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of the present application.

The following structural or functional descriptions of examples disclosed herein are merely intended for the purpose of describing the examples and the examples may be implemented in various forms. The examples are not meant to be limited, but it is intended that various modifications, equivalents, and alternatives are also covered within the scope of the claims.

Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

It will be understood that when a component is referred to as being "connected to" another component, the component may be directly connected or coupled to the other component or intervening components may be present.

As used herein, the singular forms "a", "an", and "the" are intended to include the plural forms as well, unless the context clearly indicates otherwise. It should be further understood that the terms "comprises" and/or "comprising", when used in this specification, specify the presence of stated features, integers, operations, elements, components or a combination thereof, but do not preclude the presence or addition of one or more other features, integers, operations, elements, components, and/or groups thereof.

Unless otherwise defined, all terms including technical or scientific terms used herein have the same meaning as, or a similar meaning to, that commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements (or similar elements) will be designated by the same reference numerals (or similar reference numerals), and redundant descriptions thereof will be omitted.

Hereinafter, the "network" may refer to the communication network of various software and hardware entities including base stations, access networks, core networks, mobility management entities, service gateways, etc. that communicate with the user terminal or user equipment (UE). Each network may provide communication coverage for a specific geographical area. The term "cell" may refer to the coverage area of the network.

Hereinafter, the UE may be referred to as a terminal, a user terminal, a communication apparatus, etc. Herein, the "user equipment" and the "terminal" may be used interchangeably. The UE may be a cellular phone, a cordless phone, a Session Initiation Protocol (SIP) phone, a Personal Digital Assistant (PDA) device, a handheld device with wireless communication function, a computing device or other processing device connected to wireless modem, a wearable device, an in-vehicle device, a terminal in Internet of vehicles, a desktop computer, a laptop computer, a handheld computing device, and/or other devices for communicating on a wireless system.

In some example embodiments, a UE that initiates a call may be called a Mobile Originated (MO) device, and a UE that receives a call may be called a Mobile Terminated (MT) device.

Hereinafter, a voice service or call may refer to a voice call service or a video call service, for example, voice phone, video phone, etc.

FIG. 1 is a diagram illustrating a process of an EPS FB call according to the 3GPP protocol.

TS 23.502 of 3GPP protocol specifies the process of an EPS FB, and is hereby incorporated herein by reference. The terms involved in this process, for example, are described below.

EPS: Evolved Packet System.

NG RAN: Next Generation Radio Access Network.

E-UTRAN: Evolved Universal Mobile Telecommunications System (UMTS) Terrestrial Radio Access Network (e.g., mobile communication radio network in LTE).

AMF: Access and Mobility Management Function.

MME: Mobility Management Entity.

SGW: Serving Gateway.

PGW: Packet Data Network (PDN) Gateway.

SMF: Session Management Function.

UPF: User Plane Function.

PCF: Policy Control function.

IMS: Internet Protocol (IP) Multimedia Subsystem.

PDU: Protocol Data Unit.

QOS: Quality of Service.

TAU: Tracking Area Update.

In step 1, UE camps on NG-RAN in the 5GS and an MO (Mobile Original) or MT (Mobile Terminated) for IMS voice session establishment has been initiated.

In step 2, the network (for example, a core network of the 5G network) initiated PDU Session modification to setup QoS (Quality of Service) flow for voice reaches the NG-RAN.

In step 3, NG-RAN is configured to support EPS fallback for IMS voice and decides to trigger fallback to EPS, taking into account UE capabilities, indication from AMF that "Redirection for EPS fallback for voice is possible", network configuration (e.g. N26 availability configuration) and radio conditions. If NG-RAN decides not to trigger fallback to EPS, then the procedure stops here and following steps are not executed. NG-RAN may initiate measurement report solicitation from the UE including E-UTRAN as target.

In step 4, NG-RAN responds indicating rejection of the PDU Session modification to setup QoS flow for IMS voice received in step 2 by PDU Session Modification Response message towards the SMF+PGW-C (or H-SMF+P-GW-C via V-SMF, in the case of home routed roaming scenario) via AMF with an indication that mobility due to fallback for IMS voice is ongoing. The SMF+PGW-C maintains the PCC rule(s) associated with the QoS Flow(s) and reports the EPS Fallback event to the PCF if PCF has subscribed to this event.

In step 5, NG-RAN initiates either handover or AN Release via inter-system redirection to EPS, taking into account UE capabilities. The SMF+PGW-C reports change of the RAT type if subscribed by PCF. When the UE is connected to EPS, either 6*a* or 6*b* is executed.

Step 6*a*: in the case of 5GS to EPS handover, and in the case of inter-system redirection to EPS with N26 interface. In either case the UE initiates TAU procedure and the UE includes active flag in the request in the case of inter-system redirection to EPS.

Step 6*b*: in the case of inter-system redirection to EPS without N26 interface. If the UE supports Request Type flag "handover" for PDN connectivity request during the attach procedure and has received the indication that interworking without N26 is supported, then the UE initiates Attach with PDN connectivity request with request type "handover".

In the case of inter-system redirection for the emergency service, the UE uses the emergency indication in the RRC message and E-UTRAN provides the emergency indication to MME during Tracking Area Update or Attach procedure.

In step 7, after completion of the mobility procedure to EPS or as part of the 5GS to EPS handover procedure, the SMF+PGW-C re-initiates the setup of the dedicated bearer (s) for the maintained PCC rule(s) in step 4 including of the dedicated bearer for IMS voice, mapping the 5G QoS to EPC QOS parameters. The SMF+PGW-C reports about Successful Resource Allocation and Access Network Information if subscribed by PCF.

The present disclosure provides a method for improving the success rate of an EPS FB call, which may enable the UE to redirect to the cell in the 4G network autonomously when the UE fails to receive a handover or redirection command from the network, thereby ensure (or improve a likelihood of) the success of the EPS FB call.

FIG. 2 is a diagram illustrating an EPS FB call process according to some example embodiments of the present disclosure. Discussion of some operations illustrated in FIG. 2 that are the same as, or similar to, those discussed above in connection with FIG. 1 may be omitted to reduce redundancy.

Referring to FIG. 2, at operation 5, if the UE fails to receive the command for handover or redirection to the 4G network transmitted by the 5G network, an autonomous redirection process may be triggered, such that the UE may autonomously redirect to a cell in the 4G network, thereby the EPS FB call process may be continued.

Figure 3:
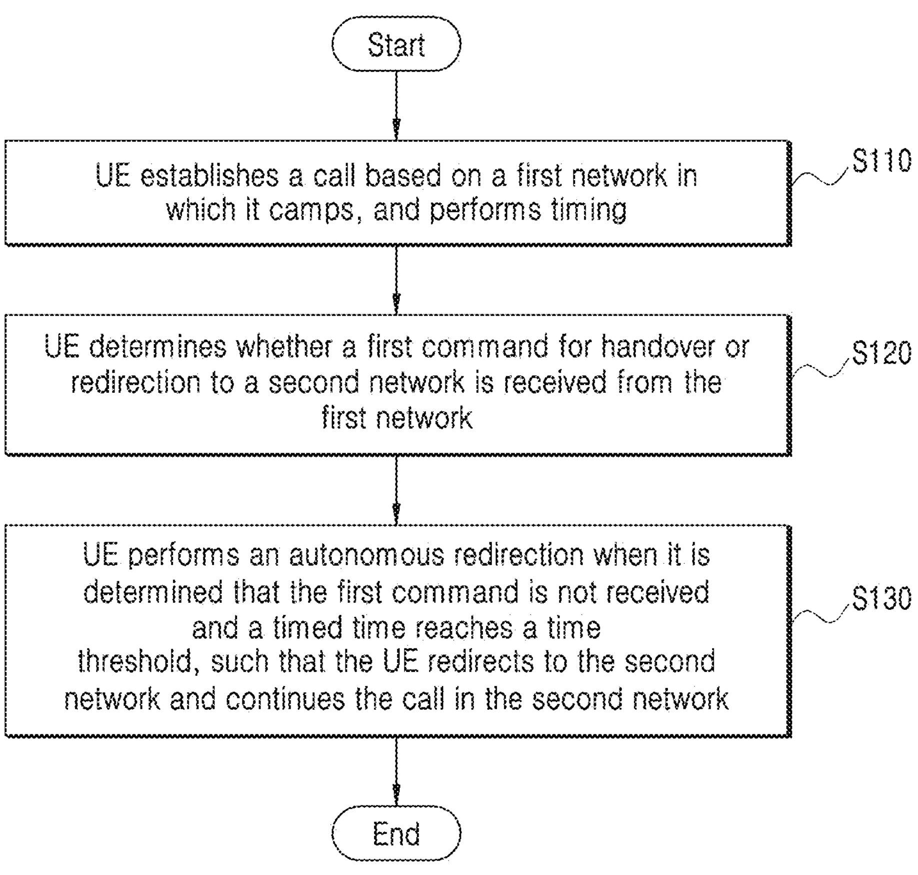
FIG. 3 is a flowchart illustrating a method for calling performed by a UE according to some example embodiments of the present disclosure.

FIG. 3 is a flowchart illustrating a method for calling performed by the UE according to some example embodiments of the present disclosure.

Referring to FIG. 3, at operation S110, the UE may establish a call based on a first network in which it camps, and perform timing, for example by a timer.

In the scenarios of the present disclosure, the UE may camp in the 5G network and establish a call in the 5G network.

In some example embodiments, if the UE is an MO device, "establishing a call" may mean that the MO device initiates a call to another device (e.g., another UE). When the MO device initiates a call, the MO device may transmit an "Invite" message to the network. At this time, the timer may be started.

In some example embodiments, if the UE is an MT device, "establishing a call" may mean that the MT device receives a call from another device (e.g., another UE). When the MT device receives the call, the MT device may receive an "Invite" message from the network. At this time, the timer may be started.

At operation S120, the UE may determine whether a first command for handover or redirection to a second network is received from the first network.

According to the EPS FB process, after the call is established, the UE waits to receive a command for handover or redirection to the 4G network as a first command, from the 5G network. In the handover-based EPS FB process, the 5G network transmits, to the UE, a MobilityfromNRCommand for handover to the 4G network as the first command. In the EPS FB process based on redirection, the 5G network transmits, to the UE, an rrcRelease command for redirection to the 4G network as the first command.

At operation S130, when it is determined that the first command is not received and the time timed by the timer reaches a predetermined or alternatively, given time threshold, the UE may perform an autonomous redirection, such that the UE redirects to the second network and continues the call in the second network. According to some example embodiments, the continuation of the call in the second network may include transmitting/receiving communication signals to/from another device (e.g., another UE) via the second network (e.g., the 4G network).

In some example embodiments, if the UE fails to receive the handover or redirection command from the 5G network within the set predetermined or alternatively, given time threshold, it indicates that the normal EPS FB process has failed. At this time, the UE may trigger the autonomous redirection process to autonomously redirect to a cell in the 4G network, and then continue to perform the subsequent operations of the EPS FB process (for example, the TAU procedure) to ensure (or improve the likelihood of) a successful establishment of the voice call.

Figure 4:
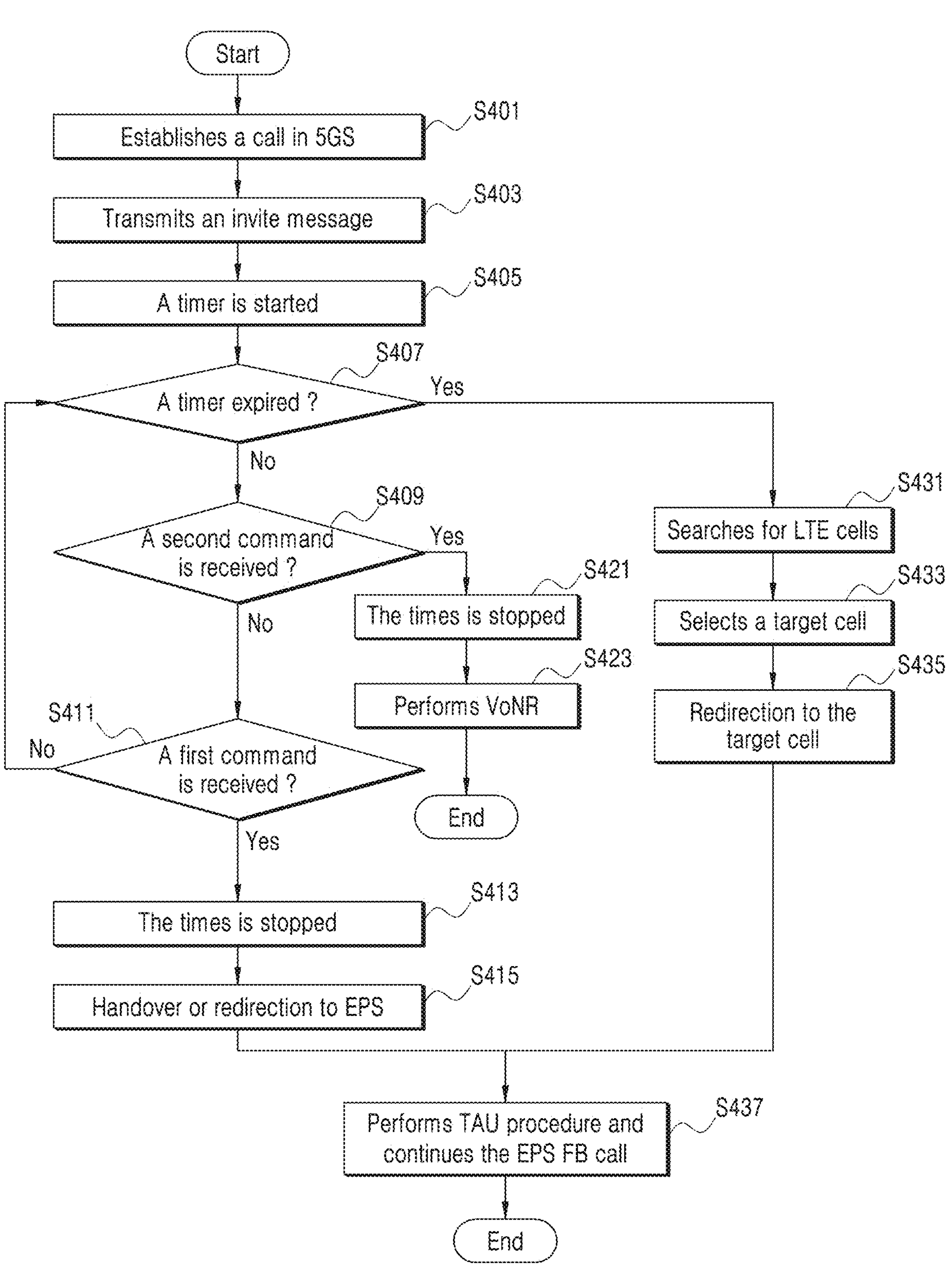
FIG. 4 illustrates a flowchart of a UE making a call in a 5G network according to some example embodiments of the present disclosure.

FIG. 4 illustrates a flowchart of UE making a call in a 5G network.

For convenience of description, the call process is described in the example of the UE being an MO device that initiates a voice call. However, the method according to some example embodiments of the present disclosure may also be applicable to an MT device that receives a voice call.

Referring to FIG. 4, at operation S401, the UE may camp in the 5G network and establish a call.

At operation S403, the UE (for example, an MO device) may transmit an invite message. The UE may receive an invite message when acting as an MT device. The invite message may be a SIP message.

At operation S405, the UE may start a timer and perform timing. In some example embodiments, the timer may be started when the MO device transmits the invite message.

At operation S407, the UE may determine whether the timer has expired (that is, whether the time counted by the timer has reached a predetermined or alternatively, given time threshold).

If the timer has not expired, at operation S409, the UE determines whether a second command for executing the call in the first network is received from the first network. In some example embodiments, the second command may be a PDU session modification command for VoNR. If "YES", the timer may be stopped at operation S421, and the UE may perform the VoNR call process in operation S423. If "NO", the UE may performs operation S411.

At operation S411, the UE determines whether the first command for handover or redirection to the second network has been received from the first network. In some example embodiments, the first command may be a command for handover or redirection to the 4G network EPS. If the UE receives a command for handover or redirection to the 4G network EPS from the network (for example, "MobilityfromNRCommand" for handover or "rrcRelease" command for redirection), it may indicate that the UE may normally perform (e.g., may perform as part of normal, or non-anomalous, operation) the process of falling back to the 4G network from the 5G network. At this time, at operation S413, the timer may be stopped. The UE may normally perform handover or redirection to the LTE cell at operation S415, then perform the TAU process at operation S437 according to the EPS FB process, and continue the EPS FB call.

If it is determined at operation S411 that the UE fails to receive the first command for handover or redirection to the second network from the first network, the process returns to operation S407.

If either the first command or the second command have not been received when the timer expires (that is, the time counted by the timer reaches the predetermined or alternatively, given time threshold), the UE may performs operations S431 to S435, so to autonomously redirect to the LTE cell.

At operation S431, the UE searches for a cell (or an LTE cell, a plurality of LTC cells, etc.) in the 4G network. At operation S433, the UE selects a relatively better (for example, the best) LTE cell as a target cell. At operation S435, the UE may redirect to the selected target cell. At operation S437, the UE may perform the TAU procedure and continue the EPS FB call.

According to some example embodiments of the present disclosure, the UE may select the target cell based on at least one of signal quality parameters and/or frequency point information of the cells. The specific scheme depends on the tolerance for call delay and network environment.

In some example embodiments, the UE may search for the reference signal receiving power (RSRP) and signal to interference plus noise ratio (SINR) values of the cell, and select the target cell based on the search result. For example, the UE may sort the obtained RSRP and SINR values and select the target cell based on the combination of RSRP and SINR values (e.g., as the LTC cell among the plurality of LTC cells having the highest combined RSRP and SINR). In some example embodiments, only RSRP may be determined as the factor in cell selection.

In some example embodiments, the UE may select the target cell according to the frequency information of the operator. For example, the LTE frequency bands of Chinese operators are mainly B3 and B41. In the condition that B3 and B41 cells cover throughout the whole network, the UE may prioritize selection of the cells corresponding to frequency points B3 and B41 as the target cells, and directly redirect to the cells with the corresponding frequency points, such that the redirection may be performed quickly and the time delay may be reduced. However, such manner may not ensure (or improve the likelihood of) the RSRP and SINR of the redirected cell meeting specific tolerance(s) of a given implementation.

In some example embodiments, the UE may select the target cell by considering the signal quality parameters together with frequency point information of the cell. For example, the UE may obtain the signal quality parameters (e.g., RSRP and/or SINR) and frequency points of cells in the 4G network, and select, as a target cell, the cell(s) having signal quality parameters greater than a predetermined (or alternatively, given) threshold and/or of which the frequency point is a predetermined (or alternatively, given) frequency point. In some example embodiments, the UE may determine a searched cell with an RSRP>−85 dB and a frequency point of B3 or B41 as the target cell, and immediately (or promptly) redirect to the target cell. In some example embodiments, the UE may determine a searched cell with an RSRP>−85 dB or a searched cell with a frequency point of B3 (or B41) as the target cell, and immediately (or promptly) redirect to the target cell.

In addition, the UE may also select the target cell based on the information of the cell in which it previously camped. In some example embodiments, the UE may select the target cell to which to be redirected based on physical cell identifier (PCI) information and/or frequency point information of the cell in which it previously camped. For example, the UE may save the PCI information and/or frequency point information of the last camped LTE cell. The UE may select, as the target cell, the previously camped cell corresponding to the current location of the UE. Alternatively, when the current location of the UE is different from the previously camped location, the UE may select, as the target cell, the cell corresponding to the frequency point of the previously camped cell.

In addition, if the UE receives a reconfiguration message (e.g., rrcReconfiguration) with measurement and control from the 5G network, the UE may select the target cell according to frequency point information in the reconfiguration message.

Figure 5:
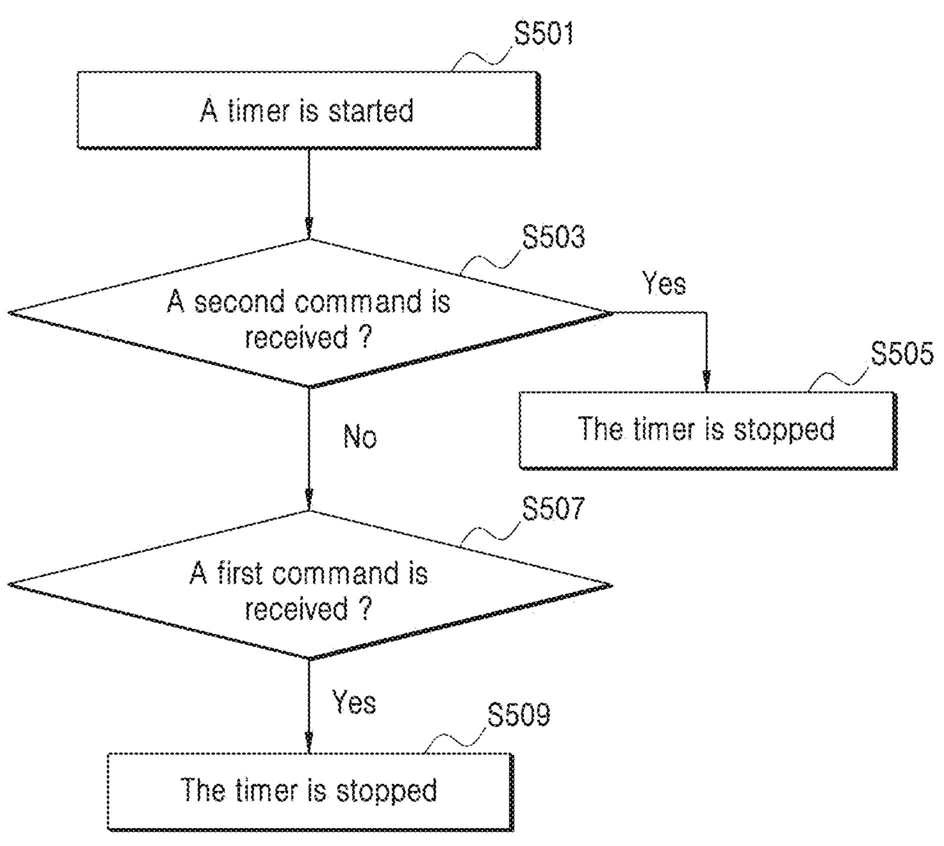
FIG. 5 is a diagram illustrating timer setting according to some example embodiments of the present disclosure.

FIG. 5 is a diagram illustrating timer setting according to some example embodiments of the present disclosure.

The UE may establish a call based on the first network in which it camps, and perform timing. At operation S501, the UE may perform timing by setting a timer, and the start point of the timer may be the time point when the UE starts sending or receiving the invite message. The invite message may be a SIP message.

In some example embodiments, when the UE is a MO device, the UE may establish a call so as to initiate a call to another device. When the MO device initiates the call, the MO device may send an invite message to the network, and the timer may be started at this time. In other words, the timer may be started to perform timing when the UE transmits the invite message.

In some example embodiments, when the UE is a MT device, the UE may establish a call so as to receive a call from another device. When the MT device receives the call, the MT device may receive an invite message from the network, and the timer may be started at this time. In other words, the timing may be started when the UE receives the invite message.

After the timer is set, if the UE normally receives the command for calling from the network (e.g., successful receives the command as part of normal, non-anomalous, operation), the timer may be stopped.

According to some example embodiments, after the timer is started, if the UE receives a second command for performing a call in the first network (for example, a PDU session modification command for establishing a VoNR voice-related QoS flow) from the network at operation S503, it may indicate that the first network supports VONR, and the UE may perform the call in the 5G network. At this time, at operation S505, the timer may be stopped.

According to some example embodiments, after the timer is started, if the UE receives a first command for handover or redirection to the second network from the network (e.g., a command for EPS FB handover "MobilityfromNRCommand" or a command for redirection to the EPS "rrcRelease") at operation S507, it may indicate that the UE may normally perform the process of falling back to the 4G network from the 5G network. At this time, in operation S509, the timer may be stopped.

If the UE fails to receive either the first command or the second command from the network when, or after, the predetermined (or alternatively, given) time threshold of the timer is reached, it may indicate that it may not be possible to perform the call of the UE c in the 5G network, nor may it be carried out according to the normal EPS FB call process. At this time, the UE may trigger the autonomous redirection process to autonomously redirect to the EPS network, thereby ensure (or improve the likelihood of) the success of the call.

The setting of predetermined or alternatively, given time threshold of the timer may consider the factors of both call delay and the call process. For example, if the predetermined or alternatively, given time threshold is too long, it may cause a long call delay and poor user experience. If the predetermined or alternatively, given time threshold is too short, the UE may trigger the autonomous redirection process before the normal handover command or the redirection command is received (e.g., before the opportunity for reception of the normal handover command or the redirection command has passed).

According to some example embodiments, the predetermined or alternatively, given time threshold may be set as a time interval from the "invite" message (e.g., start of transmission of the invite message or reception of the invite message) to the "MobilityfromNRCommand" handover command or the time interval from the "invite" message to the "rrcRelease" redirection command. According to some example embodiments, the predetermined or alternatively, given time threshold may be set to 1 s-2.5 s depending on the network environment and tolerances of call delay. In some example embodiments, the predetermined or alternatively, given time threshold may be set to 1.5 s.

In addition, the predetermined or alternatively, given time threshold may also be defined by a user (e.g., a terminal user, network operation/technician, etc.) according to the actual operation situation of network, which is not limited according to some example embodiments.

FIG. 6 illustrates a process of handover-based EPS FB call according to some example embodiments of the present disclosure.

In FIG. 6, "UE" indicates the user equipment side and "NW" indicates the network side. It should be understood that FIG. 6 may only illustrate the operations of a handover-based EPS FB call process for convenience of description. In some example embodiments, some operations may be omitted or additional operations may be added.

Referring to FIG. 6, at operation S601, a UE may register in a 5G network NR. Then, at operation S603, the UE may register in the IMS. When the UE receives a call from another UE, at operation S605, the UE may receive an invite message, and the timer may be started to perform timing at this time. Later, at operation S607, the UE may perform a 183 session process.

When the UE receives a PDU session modification command for VoNR from NW at operation S609, the timer may be stopped, and the UE may perform the VoNR call. In this case, the subsequent operations will not be performed.

Alternatively, the UE may perform operations S611 to S615 depending on the specific configuration of the network. In some example embodiments, the network may transmit an rrcReconfiguration command to the UE at operation S611; the UE may transmit an rrcReconfigurationComplete command to the network at operation S613; and the UE may transmit a measurement report to the network at operation S615.

At operation S620, the UE may determine whether a command for handover to the 4G network "MobilityfromNRCommand" is received from NW. If "YES", the UE may perform the subsequent EPS FB process specified by the 3GPP protocol in operations S621 to S627. In some example embodiments, the UE may transmits an rrcConnectionReconfiguration command to the LTE network at operation S621; the LTE network may transmit an rrcConnectionReconfigurationComplete command to the UE at operation S623; the UE may perform the TAU procedure at operation S625; and the IMS call process of the UE may be completed at operation S627.

If the UE fails to receive the command of "MobilityfromNRCommand" from the network when or after the predetermined (or alternatively, given) time threshold of the timer is reached, the autonomous redirection process of operations S631 to S635 may be triggered. Operations S631 to S635 in FIG. 6 correspond to operations S431 to S435 in FIG. 4, and the description thereof will not be repeated herein for conciseness.

After being redirected to the selected target cell, the UE may perform a TAU procedure at operation S637. At operation S639, the IMS call process performed by the UE may be completed.

FIG. 7 illustrates a process of redirection-based EPS FB call according to some example embodiments of the present disclosure.

It should be understood that FIG. 7 may only illustrate the operations of a redirection-based EPS FB call process for convenience of description. In some example embodiments, some operations may be omitted or additional operations may be added.

Operations S701 to S715, S725 to S727 and S731 to S739 in FIG. 7 correspond to operations S601 to S615, S625 to S627 and S631 to S639 in FIG. 6, respectively, and the description thereof may not be repeated herein for conciseness.

At operation S720, the UE may determine whether an rrcRelease command for redirection to the 4G network is received from NW. If "YES", the UE may perform a subsequent EPS FB process specified by the 3GPP protocol in operations S725 to S727.

If the UE fails to receive the rrcRelease command from the network when or after the predetermined (or alternatively, given) time threshold of the timer is reached, the autonomous redirection process (e.g., operations S731 to S735) may be triggered to enable the UE to redirect to the selected target cell. Then, in operation S737, the UE may perform the TAU procedure. At operation S739, the IMS call process performed by the UE may be completed.

Figure 8:
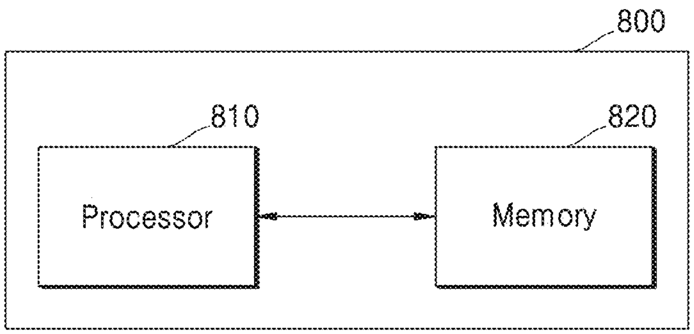
FIG. 8 illustrates a block diagram of a communication apparatus according to some example embodiments of the present disclosure.

FIG. 8 illustrates a block diagram of communication apparatus according to some example embodiments of the present disclosure.

As shown in FIG. 8, a communication apparatus 800 according to some example embodiments of the present disclosure includes a processor 810 and/or a memory 820.

The processor 810 may control the overall operation of the communication apparatus 800, and may control part or all of the internal elements of the communication apparatus 800. The processor 810 may be implemented as a wireless communication baseband processor, a communication processor CP, a general-purpose processor, an application processor (AP), an application specific integrated circuit, a field programmable gate array, etc., but some example embodiments are not limited thereto. The processor 810 may be configured to implement the methods for calling disclosed herein.

The memory 820 may include volatile memory and/or non-volatile memory. The memory 820 may store various data generated and used by the communication apparatus 800. For example, the memory 820 may store an operating system and/or an application program (for example, an application program associated with the methods disclosed herein) used to control the operation of the communication apparatus.

Figure 9:
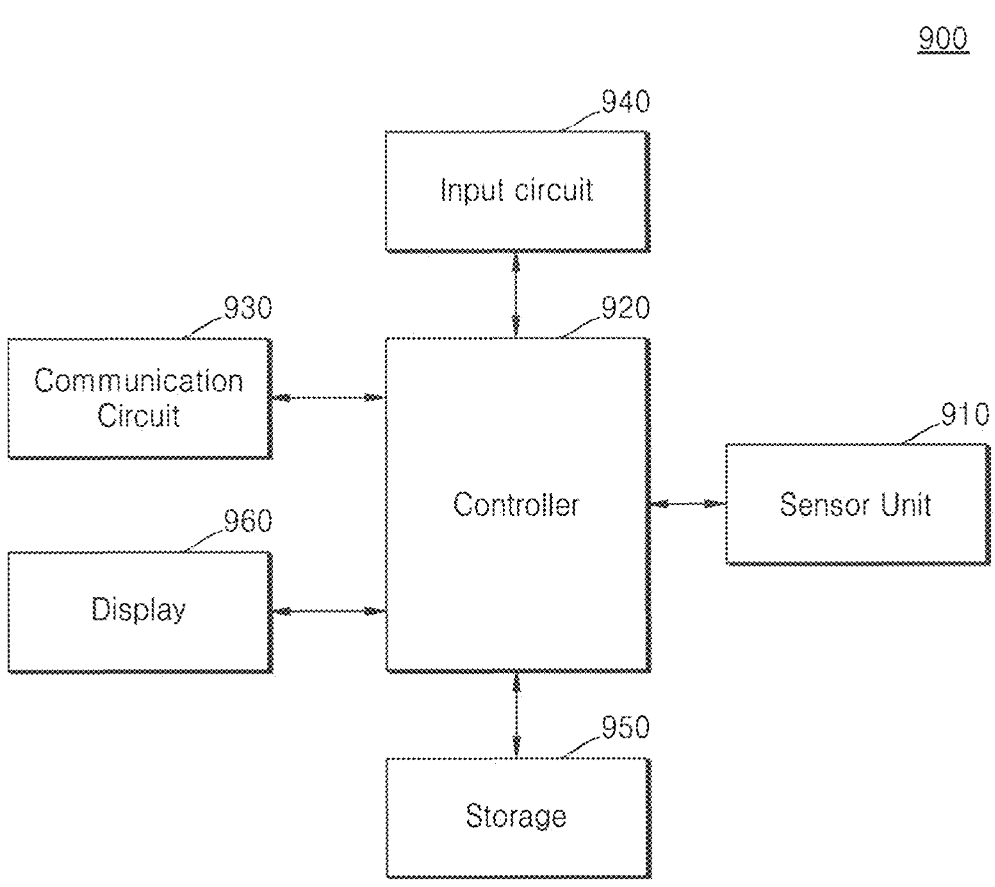
FIG. 9 illustrates a block diagram of UE according to some example embodiments of the present disclosure.

FIG. 9 illustrates a block diagram of UE according to some example embodiments of the present disclosure.

The UE 900 may be a cellular phone, a cordless phone, a Personal Digital Assistant (PDA) device, a handheld device with a wireless communication function, a computing device or other processing device connected to a wireless modem, a wearable device, an in-vehicle device, a terminal in internet of vehicle, a desktop computer, a laptop computer, a handheld communication apparatus, a handheld computing device, and/or other devices for communicating on a wireless system.

As shown in FIG. 9, the UE 900 according to some example embodiments may include a sensor unit (circuit) 910, a controller 920, a communication circuit 930, an input circuit 940, a storage 950, and/or a display 960. The UE 900 may further include additional circuits.

The sensor unit 910 may sense the environment of the UE 900.

The controller 920 may control the overall operation of the UE, and may control part or all of the internal elements of the UE. The controller 920 may be implemented as, for example, a general-purpose processor, an application processor (AP), an application specific integrated circuit and/or a field programmable gate array, but it is not limited thereto.

The communication circuit 930 may perform the communication operation of the UE 900 with another UE or a communication network. According to some example embodiments, the communication circuit 930 may establish a call to another UE under the control of the controller 920.

For example, the communication circuit 930 may establish a call based on the first network in which it camps, and perform timing. The communication circuit 930 may determine whether a first command for handover or redirection to a second network is received from the first network. The communication circuit 930 may perform an autonomous redirection when it is determined that the first command is not received and the timed time reaches a predetermined (or alternatively given) time threshold, such that the UE 900 redirects to the second network and continues the call in the second network.

The input circuit 940 may receive various input information and control signals, and send the input information and control signals to the controller 920. The input circuit 940 may be implemented through various input devices such as a keypad and/or keyboard, and/or a touch screen and/or a stylus, but is not limited thereto.

The storage 950 may include volatile memory and/or nonvolatile memory. The storage 950 may store various data generated and used by the UE 900. For example, the storage 950 may store an operating system, an application program (for example, an application program associated with the method of the present disclosure) for controlling the operation of the UE 900.

The display 960 may display various information based on the control of the controller 920.

Conventional devices and methods for performing an evolved packet system fallback (EPS FB) from a first network to a second network are not sufficiently resilient. For example, in circumstances in which the conventional devices fail to receive a command for a handover or redirection in connection with the EPS FB (e.g., due to a poor network environment) a call associated with the EPS FB fails. Accordingly, the fragility of the conventional devices and methods results in insufficient call quality and/or reliability.

However, according to some example embodiments, improved devices and methods are provided for performing an EPS FB. For example, the improved devices and methods may perform an autonomous redirection in response to determining that a command associated with the EPS FB has not been received within a threshold duration. Accordingly, the improved devices and methods may ensure, or improve the likelihood of, the success of a call associated with the EPS FB. Therefore, the improved devices and methods overcome the deficiencies of the conventional devices and methods to at least improve call quality and/or reliability by improving the resilience of the EPS FB process.

Operations described herein as being performed by the communication apparatus 800, the processor 810, the UE 900, the sensor unit 910, the controller 920, the communication circuit 930, the network, the UE, the 5G network, the 4G network, the base station, the NG RAN, the timer, the first network and/or the second network may be performed by processing circuitry. The term "processing circuitry" as used in the present disclosure may refer to, for example, hardware including logic circuits, a hardware/software combination (such as a processor executing software), or a combination thereof. For example, the processing circuitry may include, but is not limited to, a central processing unit (CPU), an arithmetic logic unit (ALU), a digital signal processor, a microcomputer, a field programmable gate array (FPGA), a system on a chip (SoC), a programmable logic units, microprocessors, application specific integrated circuits (ASICs), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The apparatuses, units, modules, devices, and other components described herein are implemented by hardware components. Examples of hardware components that may be used to perform the operations described in the present disclosure where appropriate include controllers, sensors, generators, drivers, memories, comparators, arithmetic logic units, adders, subtractors, multipliers, dividers, integrators, and any other electronic components configured to perform the operations described in the present disclosure. In other examples, one or more of the hardware components that perform the operations described in the present disclosure are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In some example embodiments, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in the present disclosure. The hardware components may also access, manipulate, process, create, and store data in response to execution of the instructions or software. For simplicity, the singular term "processor" or "computer" may be used in the description of the examples described in the present disclosure, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in the present disclosure may be performed by computing hardware, for example, by one or more processors or computers, implemented as described above executing instructions or software to perform the operations described in the present disclosure that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In some example embodiments, the instructions and/or software include machine code that is directly executed by the processor or computer, such as machine code produced by a compiler. In some example embodiments, the instructions or software include higher-level code that is executed by the processor or computer using an interpreter. Persons and/or programmers of ordinary skill in the art may readily write the instructions and/or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, may be recorded, stored, or fixed in or on one or more non-transitory computer-readable storage media. Examples of a non-transitory computer-readable storage medium include at least one of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, compact disc (CD)-ROMs, CD-Rs, CD+Rs, CD-RWs, CD+RWs, digital video disc (DVD)-ROMs, DVD-Rs, DVD+Rs, DVD-RWs, DVD+RWs, DVD-RAMs, Blu-ray disc (BD)-ROMs, BD-Rs, BD-R LTHs, BD-REs, blue-ray or optical disk storage, hard disk drive (HDD), solid state drive (SSD), flash memory, a card type memory such as multimedia card or a micro card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and providing the instructions or software and any associated data, data files, and data structures to a processor or computer so that the processor or computer may execute the instructions.

Some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

While some example embodiments have been described, it will be apparent to those skilled in the art that various changes in form and details may be made without departing from the spirit and scope of the present discourse defined by the claims and their equivalents.

What is claimed is:

1. A method for calling performed by a user equipment (UE), the method comprising:

establishing, by the UE, a call based on a first network in which the UE camps;

determining, by the UE, whether a first command for handover or redirection to a second network is received from the first network; and performing, by the UE, an autonomous redirection in response to determining that the first command is not received and a duration between the establishing and the determining exceeds a first threshold, the autonomous redirection redirecting the UE to the second network for continuation of the call.

2. The method of claim 1, wherein the call is a first call; and the method further comprises establishing a second call based on the first network in which the UE camps, performing the handover or redirection to the second network in response to determining that a second command is received, the second command being for the handover or redirection to the second network; and executing the second call in the second network.

3. The method of claim 1, further comprising:

determining whether a second command for executing the call in the first network is received from the first network; and performing one of executing the call in the first network in response to determining that the second command is received, or the determining of whether the first command is received from the first network in response to determining that the second command is not received.

4. The method of claim 1, further comprising:

starting a timer when an invite message is transmitted or received by the UE, wherein the duration is measured from the starting of the timer.

5. The method of claim 1, wherein the first threshold is within a range of 1 s to 2.5s.

6. The method of claim 4, wherein the first threshold is 1.5s.

7. The method of claim 1, wherein the performing the autonomous redirection comprises:
selecting a target cell from among cells in the second network; and
redirecting from the first network to the target cell.

8. The method of claim 7, wherein the selecting the target cell comprises:
obtaining signal quality parameters or frequency points of the cells in the second network; and
selecting as the target cell one of
a cell having a signal quality parameter greater than a second threshold, or
a cell of which a frequency point is a first frequency point.

9. The method of claim 7, wherein the selecting the target cell comprises:
selecting the target cell based on information of a cell in which the UE has previously camped.

10. The method of claim 7, wherein the selecting the target cell comprises:
selecting the target cell based on a reconfiguration message received by the UE from the first network.

11. The method of claim 1, wherein the first network is a 5G network and the second network is a 4G network.

12. A communication apparatus comprising:
processing circuitry configured to
establish a call based on a first network in which the communication apparatus camps,
determine whether a first command for handover or redirection to a second network is received from the first network, and
perform an autonomous redirection in response to determining that the first command is not received and a duration exceeding a first threshold, the duration being between the establishment of the call and the determination that the first command is not received, and the autonomous redirection redirecting the communication apparatus to the second network for continuation of the call.

13. The communication apparatus of claim 12, wherein the processing circuitry is configured to:
perform the handover or redirection to the second network in response to determining that the first command is received; and
execute the call in the second network.

14. The communication apparatus of claim 12, wherein the processing circuitry is configured to
determine whether a second command for executing the call in the first network is received from the first network, and
execute the call in the first network in response to determining that the second command is received; and
the determination of whether the first command is received from the first network is performed in response to determining that the second command is not received.

15. The communication apparatus of claim 12, wherein
the processing circuitry is configured to start a timer when an invite message is transmitted or received by the communication apparatus; and
the duration is measured from the start of the timer.

16. The communication apparatus of claim 12, wherein the first network is a 5G network and the second network is a 4G network.

17. A non-transitory computer-readable storage medium storing instructions that, when executed by at least one processor of a user equipment (UE), cause the at least one processor to execute a method for calling, the method comprising:
establishing a call based on a first network in which the UE camps;
determining whether a first command for handover or redirection to a second network is received from the first network; and
performing an autonomous redirection in response to determining that the first command is not received and a duration between the establishing and the determining exceeds a first threshold, the autonomous redirection redirecting the UE to the second network for continuation of the call.

18. The non-transitory computer-readable storage medium of claim 17, wherein
the call is a first call; and
the method further comprises,
establishing a second call based on the first network in which the UE camps,
performing the handover or redirection to the second network in response to determining that a second command is received, the second command being for the handover or redirection to the second network, and
executing the second call in the second network.

19. The non-transitory computer-readable storage medium of claim 17, wherein the method further comprises:
determining whether a second command for executing the call in the first network is received from the first network; and
performing one of
executing the call in the first network in response to determining that the second command is received, or
the determining of whether the first command is received from the first network in response to determining that the second command is not received.

20. The non-transitory computer-readable storage medium of claim 17, wherein the first network is a 5G network and the second network is a 4G network.

* * * * *